United States Patent [19]
Dahlin et al.

[11] 3,851,175
[45] Nov. 26, 1974

[54] MOISTURE GAUGE WITH OPACITY TYPE COMPENSATION

[75] Inventors: Erik B. Dahlin, Saratoga; Carolyn M. Bjorklund, Palo Alto, both of Calif.

[73] Assignee: Measurex Corporation, Cupertino, Calif.

[22] Filed: Mar. 25, 1974

[21] Appl. No.: 454,722

Related U.S. Application Data

[63] Continuation of Ser. No. 301,521, Oct. 27, 1972, abandoned.

[52] U.S. Cl. .................. 250/339, 250/343, 250/345, 356/76
[51] Int. Cl. ............................................. G01j 3/34
[58] Field of Search ........... 250/226, 343, 345, 339; 356/76–78

[56] References Cited
UNITED STATES PATENTS

| | | | |
|---|---|---|---|
| 3,089,382 | 5/1963 | Hecht et al. | 250/226 |
| 3,405,268 | 10/1968 | Brunton | 250/339 |

Primary Examiner—Harold A. Dixon
Attorney, Agent, or Firm—Flehr, Hohbach, Test, Albritton & Herbert

[57] ABSTRACT

A method and apparatus for measuring the moisture content of a moving sheet of paper being manufactured by a paper machine from pulp having a varying composition that includes a dual wave length gauge that provides a signal representative of the ratio of the absorption of radiation in a band highly sensitive to absorption by water and in a nearby band that is less sensitive to absorption by water. Means are provided for supplying a signal related to the opacity of the paper. The ratio readings are combined with the opacity signal to provide a signal indicative of the water weight per unit area of the paper which is independent of the composition of the pulp.

5 Claims, 10 Drawing Figures

FIG_1

FIG_1A

FIG_1B

FIG_2

FIG_3

FIG_4

FIG_6

FIG_5

FIG_7

FIG_8

MOISTURE GAUGE WITH OPACITY TYPE COMPENSATION

This is a continuation of application Ser. No. 301,521 filed Oct. 27, 1972 and now abandoned.

BACKGROUND OF THE INVENTION

The present invention relates to moisture gauges for continuously measuring the moisture in a sheet of moving paper. More particularly the invention relates to infrared moisture gauges that are compensated for variations in the types of fiber present in the paper.

Moisture gauges for measuring the moisture content of a moving sheet of paper being manufactured by a paper machine are well known in the art. One type of gauge includes an infrared (IR) radiation source that emits radiation in two spectral bands. One band, typically around 1.8 microns, is used as a reference because it is relatively insensitive to moisture and yet is near a moisture absorption band. A second band, typically around 1.9 microns, is highly sensitive to absorption by water. The attenuation of the 1.9 band therefore gives a good indication of the amount of moisture in the paper. A beam of IR radiation carrying both the 1.8 and the 1.9 wavelengths is focused on the paper, and the radiation transmitted in the case of a transmission gauge or reflected in the case of a backscatter gauge is detected by cells that produce an output signal proportional to the intensity of the received radiation. The 1.8 and 1.9 signals are combined to provide a signal compensated for absorption by the fibers in the paper, dirt buildup on the gauge windows, and changes in the electronics due to temperature variation. The combination of the 1.8 and 1.9 may take the form of a pure ratio or may be a ratio type combination that is modified by various calibration constants some of which may be updated by standardization.

The signal, R, representative of the ratio of the 1.8 and 1.9 wavelengths, is converted to percent moisture by a procedure called calibration which is typically done in the following manner. A number of samples are selected, each having the same basis weight, and are bone dryed or dryed with a fixed percentage moisture. Different quantities of water are then added to each sample and they are sealed in plastic bags to allow the water to be absorbed by the paper. After additional weighing, the actual water weight, W, of the samples is then known.

The next step in the calibration procedure is to place one sample at a time in the moisture gauge and obtain a ratio reading, R, for each sample. The R values are then plotted against the water weight values determined by the weighing process previously mentioned and the best curve is then fitted to the sample points. The curve is then mathematically modeled with the constants determined from the plotted curve.

A good account of the calibration procedure is given by U.S. Pat. No. 3,641,349 issued to Dahlin. There it is pointed out that water weight is related to the ratio signal according to the following equation:

$$W = W_0 + (R - R_0)(A*B_w + B) \text{ TM (1)}$$

where $W_0$, $R_0$, $A$ and $B$ are constants which are updated by standardization and $B_w$ is the bone dry basis weight. From equation (1) it can be seen that water weight is not only a function of the ratio signal but also a function of another variable, namely basis weight. In fact, the slope of the water weight versus ratio curve is a linear function of basis weight with constants $A$ and $B$.

It was also pointed out in the Dahlin patent, supra, that equation constants were in fact constant only over a limited basis weight range. Consequently, for paper machines that made paper varying over a wide range of basis weight, that is, a broad range of paper grades, a separate set of constants were determined for each grade or grade group.

Although the use of equation (1) and the calibration procedures just described provide accurate results under many circumstances, it was discovered that substantial measurement inaccuracies may still result if changes in the pulp occur.

The pulp supplied to a paper machine may come from hardwood trees, softwood trees, recycled paper, and may have a variety of different additives. In addition, the degree of refining significantly affects the pulp. When such things as the hardwood/softwood percentage or recycle paper percentage vary, they may throw the moisture reading off by as much as three percent. And such an error is unacceptable when measurements to within one-half percent are demanded. Thus it is an object of this invention to provide a moisture gauge that is compensated for variation in the pulp mixture.

It is another object of the invention to provide a moisture gauge that is compensated for variations in the hardwood/softwood mix of the pulp.

It is yet another object of the invention to provide a moisture gauge that is compensated for variations in opacity due to coatings or fiber orientation.

Finally it is an object of the invention to provide a dual channel moisture gauging apparatus that also provides a signal indicative of the opacity of the paper.

SUMMARY OF THE INVENTION

Pursuant to the foregoing objects, a moisture gauging apparatus is provided that includes a radiation source that emits a first spectral band of radiation lying outside but near the absorption band of water, and a second spectral band of radiation that lies within the absorption band of water. A beam of radiation containing both of said spectral bands is directed onto the paper whose moisture content is to be determined. A receiver is provided for detecting the radiation, either transmitted through the paper or backscattered from the paper, and includes means for converting the information received in said spectral bands to an electrical signal indicative of the ratio of the energy received in said bands. Means are also provided for supplying a signal indicative of the opacity of the paper. The opacity indication is combined with the ratio indication to provide a compensated moisture reading that is insensitive to pulp variations.

Figure 1:
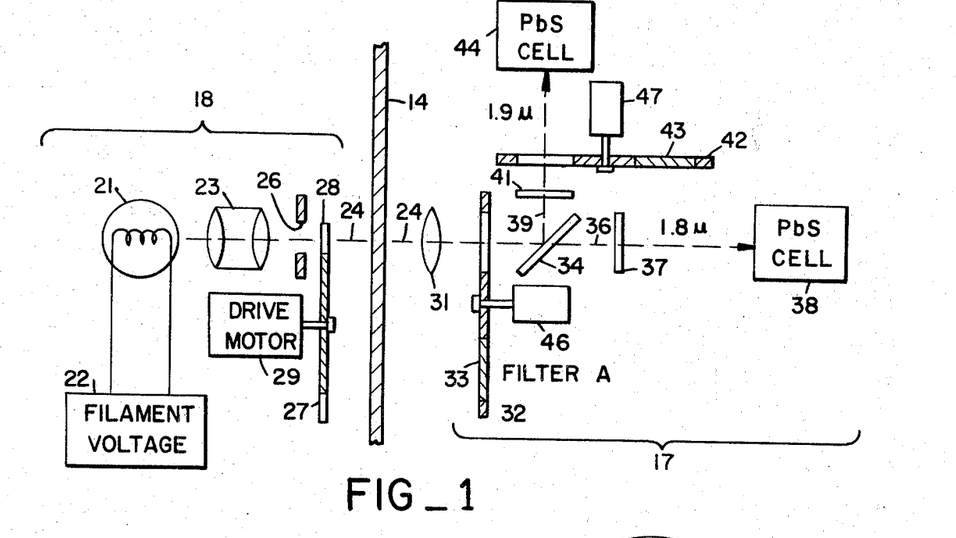
FIG. 1 is a schematic representation, partially in block diagram form and partially in cross-section, of a portion of the mechanical configuration required by the present invention.

In order to more fully understand the present invention, it is helpful to first understand the prior art in detail. In doing this, it is useful to start with the basic physical structure as illustrated in FIG. 1. As with other commercial moisture gauges, there is both a source unit and a detector unit. In the case of the transmission gauge, the paper is passed between the source and detector. In the case of the backscatter type gauge, both the source and the detector are on the same side of the paper. The present invention applies equally to both types of gauges.

Figure 1A:
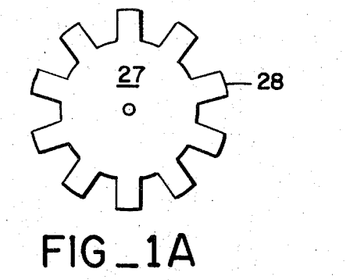
FIG. 1A is a plan view of one of the elements of FIG. 1.

Referring to FIG. 1, the source unit is indicated generally by reference numeral 18 and consists of a tungsten light source 21 having a filament voltage source 22 capable of remote adjustment. The light source 21 may be of the General Electric type Q.Ga/t⁴DCR, 200 watts, capable of supplying radiation in both the 1.8 and 1.9 micron wavelength bands. Radiation from source 21 is collimated by an optical system schematically shown by element 23. The collimated beam is indicated by dashed line 24 and extends through an aperture 26 where it encounters a chopper wheel 27 that is best illustrated in FIG. 1A. Chopper wheel 27 is rotated at high speeds, and is located in connection with light beam 24 so that the teeth 28 thereof recurrently interrupt the beam and cause the light passing beyond to take the form of a series of sharp pulses having a frequency which is determined by the rotational velocity of the wheel, its diameter, and the geometry of the teeth. A drive motor 29 is connected to chopper wheel 27 and would typically be of the variable speed type so that the chopping frequency could be varied.

Figure 1B:
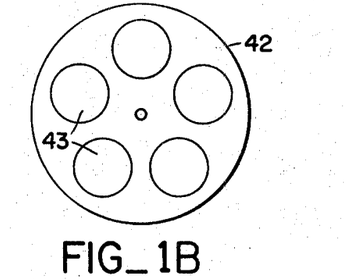
FIG. 1B is a plan view of another of the elements of FIG. 1.

After chopping, beam 24 is passed through paper sheet 14 where it is collected by lens 31 of detector unit that is indicated generally by reference numeral 17. The beam is attenuated by the paper, and the attenuation is a function of both the moisture in the paper and also the opacity of the paper. The collected and collimated beam is transmitted through a first radiation filter assembly 32 deignated the A filter which consists of a disk having several filters 33. In the position shown in the figure, there is no filter in the beam path. After leaving the A filter the beam passes through a beam splitter 34 which may, for example, be a half silvered mirror. One portion of the split beam, identified by numeral 36, passes through a filter 37 which has a pass band centered around 1.8 microns. The filtered beam is then detected by lead sulfide cell 38. The other portion of the split beam, identified by reference numberal 39, passes through filter 41 having its pass band centered around 1.9 microns. Beam 39 is then passed through a second standardization filter assembly 42, designated the B filter, which includes several different filters 43 as best illustrated in FIG. 1B. Beam 39 is then detected by lead sulfide cell 44.

The electronics of the gauge, a preferred embodiment of which will be described later, performs the basic function of (1) supplying appropriate power to the lead sulfide cells, (2) converting the variations in resistance of the cells caused by variations in the radiation received by the cells to electrical signals, and (3) ratioing the signals from the 1.8 and 1.9 micron channels. The resulting ratio signal, R, is proportional to the water weight, W, in the paper.

Figure 2:
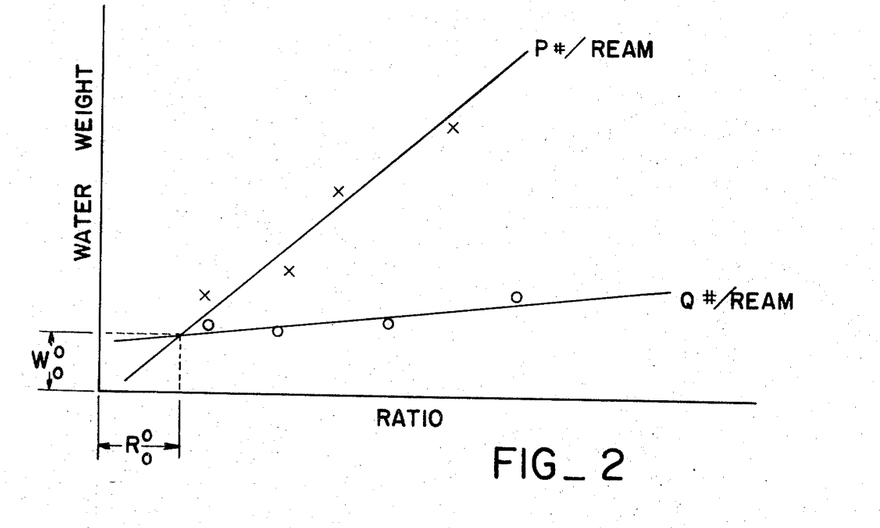
FIG. 2 is a graph illustrating a conventional calibration procedure.

To understand how the ratio signal, R, is converted to water weight, W, it is helpful to refer to FIG. 2. The curves shown can be expressed by equation (2):

$$W = W_o + (R - R_o)(A*Bw + B) \quad (2)$$

where $W_o$, $R_o$, $A$ and $B$ are constants which are updated by standardization. Bw is theoretically the bone dry basis weight. However, wet Bw may still be used with low accuracy. The percent moisture is indicated by:

$$\text{Percent Moisture} = W/(BW + W) * K \quad (3)$$

where $K$ is a constant for unit conversion.

In the original calibration of the moisture gauge, several moisture samples are prepared for two different grades in a group. Preferably the two different grades are ones with significant weight separation, for example 40 pounds per ream and 50 pounds per ream. From 8 to 15 samples of each grade are selected as close to the standard weight per ream as possible and are bone dryed or dryed with a fixed percentage of moisture remaining and then weighed. This determines their bone dry basis weight. In this condition, different quantities of water are then added to each sample. The samples are then sealed in individual plastic bags to allow the water to be absorbed by the paper. After additional weighing, the actual water weight, W, of the samples is known.

The next step in the calibration process is to place one sample at a time in the gap of the moisture gauge. A suitable jig (not shown) is used for this purpose. The gauge is caused to make a reading and a ratio, R, is obtained with each sample. The R values are then plotted against the water weight values and the best line is fitted to the samples for each group as indicated by the zeros in the case of the Q pounds per ream curve and the X's in the case of the P pounds per ream curve of FIG. 2.

The intersection of the two fitted lines is then determined as indicated as $W_o{}^o$ and $R_o{}^o$. At this point, the water weight/ratio function is independent of basis weight. Indeed, changes in basis weight merely cause the lines to rotate around this point.

Next, to determine the constants $A$ and $B$ of equation (2), the slopes of line P and line Q are calculated in the following manner to determine the initial values of $A$ and $B$ designated $A_o$ and $B_o$:

$$A_o = \frac{\frac{\Delta W}{\Delta R}(\text{line } A) - \frac{\Delta W}{\Delta R}(\text{line } B)}{Bw(\text{line } A) - Bw(\text{line } B)}. \quad (4)$$

$$B_o = \Delta W/\Delta R \text{ (line } A) - A_o * Bw \text{ (line } A)$$

(5)

where $\Delta W/\Delta R$ is equal to the slope of the fitted line. As will be explained below, the initial values $A_o$ and $B_o$ are updated by standardization.

Another part of the initial calibration or setup procedure for each grade group is the derivation of two additional ratio constants, $R_A$ and $R_B$, which are values obtained from the output of the measuring system. Referring to FIG. 1, when standardization filter A is in the total beam, $R_A$ is read; $R_B$ is a ratio taken with both the filter A in the total beam path and filter B which is in beam path 39 only. These readings are taken with no paper sheet in the gap.

After initial calibration, the constants $A_o$, $B_o$, $R_A^o$ and $R_B^o$ are stored in a computer or other suitable means for use in the actual measurement procedure. At the end of some number of scans over a paper sheet whose moisture content is being measured, standardization is performed. More specifically, the ratio $R_A$ is computed with the filter A in the beam and similarly the ratio $R_B$ is computed with the additional filter B in the 1.9 micron beam. The updated values of $A$, $B$, $R_o$ and $W_o$ are provided in the standardization procedure by use of the following formulas:

$$A = A_o [(R_A^o - R_B^o)/(R_A - R_B)]$$

(6)

$$B = B_o [R_A^o - R_B^o/R_A - R_B]$$

(7)

$$R_o = R_o^o + R_A - R_B$$

(8)

$$W_o = W_o^o$$

(9)

Note that the initial water weight $W_o^o$, typically need not be updated. Also note that equations (6) and (7) rotate the calibration lines P and Q in FIG. 2 and that equation (8) performs lateral shift of the line being used for the measurements.

Thereafter with the use of equations (2) and (3) the percent moisture can be computed for the paper sheet being measured.

The basis weight reading may be supplied from a basis weight measuring system as described in copending application Ser. No. 115,100, entitled *Basis Weight Gauging Method*, filed Feb. 12, 1971 continued as Ser. No. 302,096 filed Oct. 30, 1972 and now U.S. Pat. No. 3,757,122, in the name of Bossen, et al. The basis weight includes the actual moisture content in a paper. Since the use of the wet basis weight will not provide sufficient accuracy for some purposes it has been found that the bone dry basis weight which is to be used in equations (2) and (3) may be found by the following equation:

$$Bw \text{ (bone dry)} = [Bw \text{ (wet)} - CW_o - BC(R - R_o)]/[1 + AC(R - R_o)]$$

(10)

where $C$ is a unit conversion factor equal to $K/100$ and $A$, $C$, $R_o$ and $W_o$ are expressions of equations (6), (7), (8) and (9). Equation (10) is derived from equations (2) and (3) by determining the convergence of these equations when the water weight in the basis weight measurement is taken into account.

As mentioned previously, this method does not provide accurate results in installations where the fiber content and additives change significantly. To see this more clearly, it is helpful to refer to FIG. 3. This figure is related to FIG. 2 in that the paper having basis weight of P lbs/ream and Q lbs/ream were used in making the samples as described above. In this case, however, the samples also had three significantly different hardwood/softwood percentages. As can be seen from the Figure, a separate calibration line is obtained for each hardwood/softwood percentage. Consequently equation (2) becomes very inaccurate since at a value of, for example, Q lbs/ream, a given ratio signal could indicate in this case three different water weights depending upon the hardwood/softwood percentages currently being used in the paper. Experimental results have shown that this phenomenon will lead to errors as great as three percent moisture.

Figure 3:
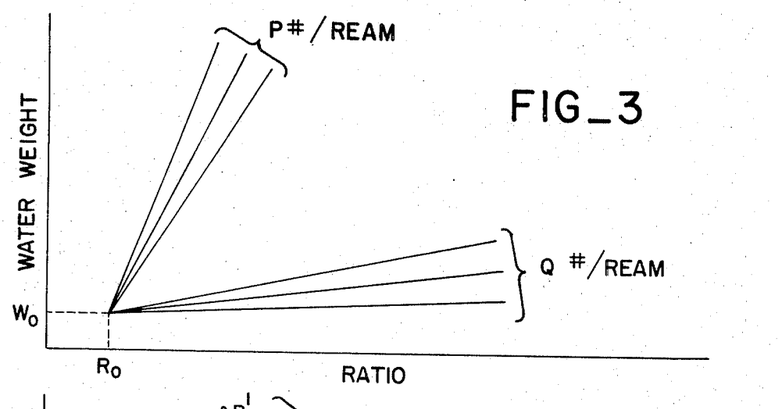
FIG. 3 is a graph illustrating the problems associated with the prior art methods for a single grade group.
Figure 4:
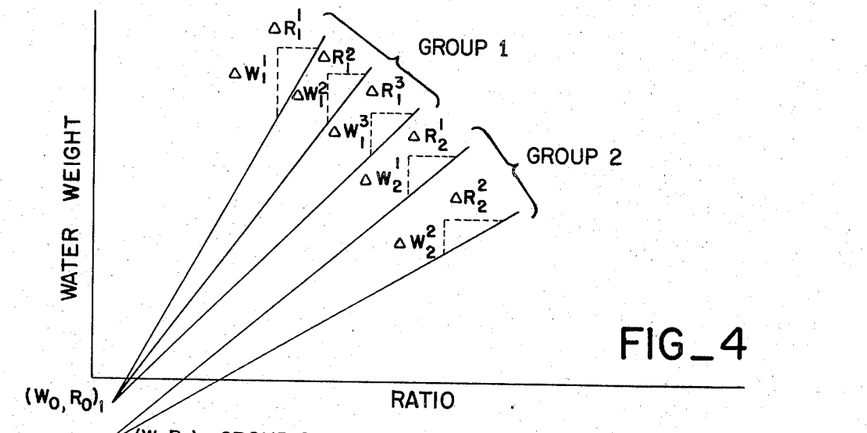
FIG. 4 is a graph of a multi-grade group situation.

FIG. 3 shows that situation for a single grade group. Note that all of the calibration lines do originate at a single point, $W_o$, $R_o$. The multiple grade group situation is shown in FIG. 4. In this Figure the calibration lines shown for group 1 were determined by picking three sets of samples, each having a significantly different hardwood/softwood proportion but identical basis weights. The samples are then prepared in the same way as previously mentioned. That is, several samples having the same hardwood-softwood proportions are prepared with different known water weights. The samples are then placed in the moisture gauge and a ratio reading taken. The ratio is then plotted against the known water weight. This procedure is followed for at least two sets of samples having different hardwood/softwood proportions.

From the foregoing, it is apparent that the prior art method of calculating moisture which is dependent upon basis weight is unsatisfactory. Consequently a key contribution of the present invention is the discovery that water weight may be more accurately determined using an opacity related signal and ratio signal rather than a basis weight signal and ratio signal as used in equation (3). By opacity is meant the property of the paper that directly determines its capacity to obstruct or attenuate the transmission of forms of radiant energy. In order to do this an opacity related signal is necessary.

Figure 5:
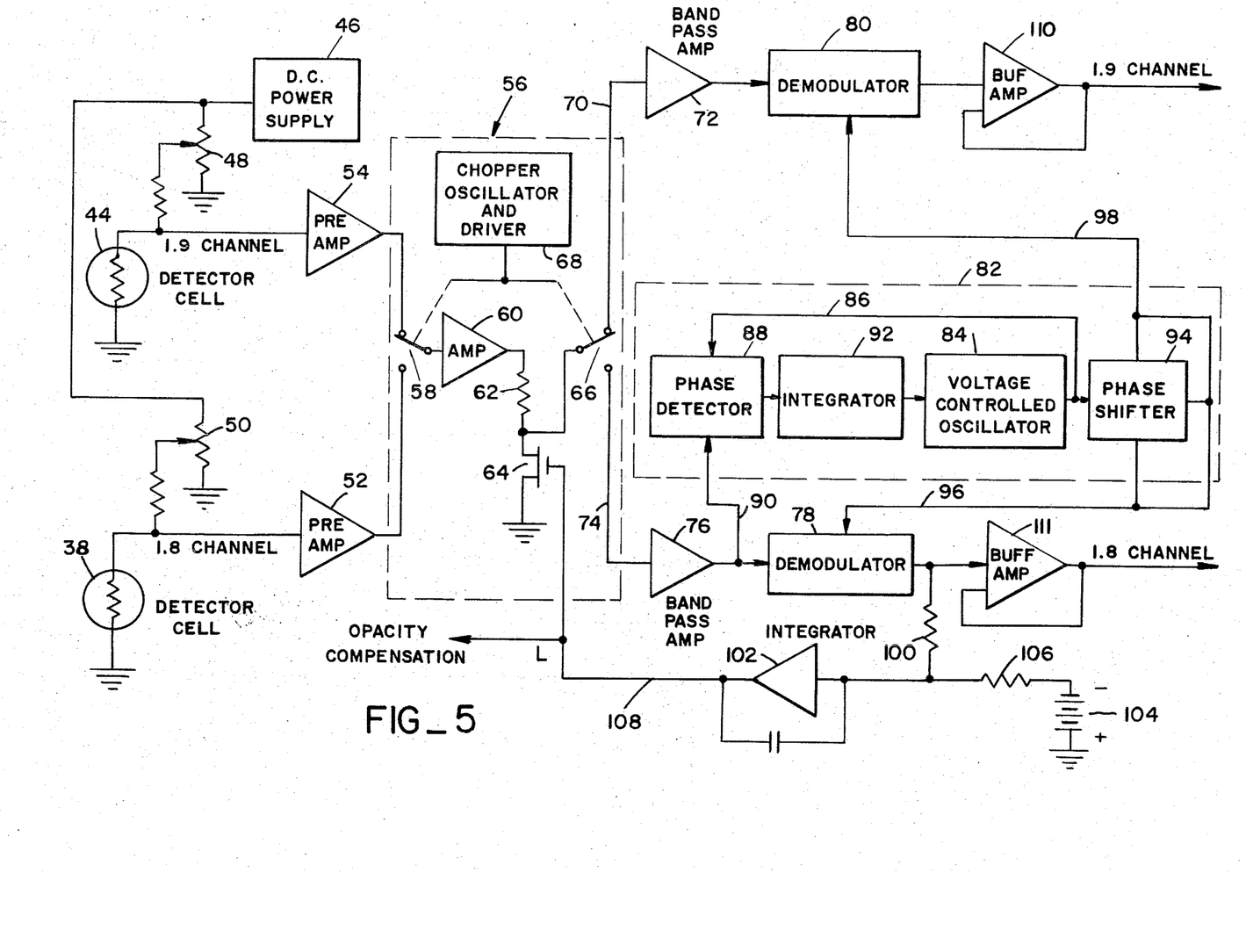
FIG. 5 is a block diagram of a preferred embodiment of the electronics of the invention.

FIG. 5 shows one preferred embodiment of the electronics which may be used with the present invention and which does provide an opacity related signal. A second preferred embodiment will be discussed in connection with FIG. 8. Referring now to FIG. 5, lead sulfide cells 38 and 44 are shown as resistors. And, in fact, they behave electrically as variable resistors, the value of which varies inversely with the intensity of radiation to which they are exposed. Cells 38 and 44 are biased by a high-voltage DC power supply 46 that typically supplies voltage in the range of 300 volts through potentiometers 48 and 50 to cells 44 and 38, respectively. Electrically connected to cells 38 and 44 are conventional preamplifiers 52 and 54 whose function is merely to raise the voltage level of the input signals.

The amplitude of the signals emerging from preamplifiers 52 and 54 often vary over a range of up to two orders of magnitude. This is caused by variations in the opacity of the paper due to variations in the pulp fiber mix and variations in basis weight. From a signal processing point of view, it is desirable to reduce the variability of these signals. This is achieved by amplifying the signals in a controlled manner such that the resultant signals are held at a constant level. For example, the 1.8 channel may be held at a value of 8 volts. However, the relationship between the 1.8 channel and the 1.9 channel must be very accurately maintained so that ratio of the two signals does not vary.

The automatic gain controlling function is performed by the apparatus indicated generally by reference numeral 56. As can be seen from FIG. 2, the 1.8 micron and 1.9 micron channels both enter and leave the automatic gain controller as independent channels. The simplest approach to performing the automatic gain control function would be to have a separate automatic gain control amplifier for each channel, but having the gain of both amplifiers respond to the same feedback signal. This approach may be used for many applications. However, it is unsatisfactory for any application where the amount of gain supplied to each channel must be rigorously controlled within very tight tolerances. The basic problem is that amplifier components do not precisely track one another. The voltage current characteristics as well as temperature characteristics of each semiconductor component will vary somewhat one from another. Consequently, even though two separate amplifiers were responding to the same feedback signal, the amount of amplification supplied to the input thereon would vary from channel to channel.

This problem is solved by time multiplexing the 1.8 and 1.9 channels, passing the multiplexed signal through a single automatic gain control amplifier network, and then demultiplexing the output. The feedback signal for the automatic gain control is taken from the output of the 1.8 micron channel. To this end, the output of amplifiers 52 and 54 are supplied to switch 58 which alternately samples the 1.8 and 1.9 micron channels. Amplifier 60 is provided to eliminate any loading of the 1.8 or 1.9 channel and thereby allows very high-speed accurate sampling. The output of amplifier 60 is supplied through resistor 62 to the source of field effect transistor 64. The drain of field effect transistor 64 is grounded. In operation, field effect transistor 64 acts as a voltage variable, voltage divider. As the resistance of field effect transistor 64 increases, the voltage supplied to switch 66 also increases. This is true because the percentage of the total voltage drop across resistor 62 is decreased.

Switches 58 and 66 are operated synchronously and are controlled by a chopper oscillator and driver circuit 68 well known in the prior art.

The output of automatic gain control apparatus 56 is a pair of amplitude modulated AC signals. The 1.9 micron channel is taken from output 70 and supplied to amplifier 72 where the output of the 1.8 channel is taken from output 74 and supplied to amplifier 76. Amplifiers 72 and 76 are narrowband amplifiers that eliminate extraneous harmonics introduced by the time multiplexing operation. The output of these amplifiers then appears as a pure sinusoidal amplitude modulated signal.

The outputs of amplifiers 72 and 76 are supplied to a pair of demodulator circuits 78 and 80 which precisely convert the information contained in the amplitude modulated AC signal to DC information. The function of demodular circuits 78 and 80 is basically that of peak detection. Such circuits are well known in the art; however, a preferred embodiment is described in a co-pending application Ser. No. 307,332, filed in the name of J. M. French, and entitled "Dual Wavelength Moisture Gauge Having Automatic Gain Control" filed Nov. 11, 1972, and now U.S. Pat. No. 3,821,553.

In order to detect the peak of the information carrying signals accurately, a carrier signal having the same frequency as and a precise phase relationship with the information carrying signal is needed. To provide this function, a phase locked loop indicated by a reference numeral 82 is provided to lock on the 1.8 micron channel. The loop consists of a conventional voltage controlled oscillator 84 which is amplitude stable. The output of voltage control oscillator 84 is supplied via lead 86 to one input of phase detector 88. The input from the 1.8 micron channel is supplied to phase detector 88 from the output of band pass amplifier 76 via lead 90. Phase detector circuit 88 is of conventional design and supplies an output signal to integrator 92 proportional to the phase relationship between the two inputs. A zero level error signal is provided when the phase is precisely 90°. Integrator 92 is provided so that there is zero residual error in the phase locked loop. The output of integrator 92 is the integral of the error signal supplied by phase detector 88. This signal is supplied to the voltage controlled oscillator 84 whose output frequency is regulated by the voltage level of the control signals supplied thereto. The output of voltage control oscillator 84 is also supplied to phase shifter network 94. This network provides a 90° phase shift between its input and output and is needed to compensate for the phase detector circuit 88 which supplies an error signal of zero when the phase relationship between the two inputs is 90°. Thus the output of phase shifter 94 is a signal having exactly the same frequency and phase as the AC signal in both the 1.8 and 1.9 micron channels being supplied to demodulators 78 and 80. The output of phase shifter 94 is supplied through leads 96 and 98 to demodulators 78 and 80.

The output of the 1.8 micron channel demodulator is utilized as a feedback to the automatic gain amplifier 56. The output of demodulator 78 is supplied through resistor 100 to the input of integrating amplifier 102. A precise voltage reference 104 is connected through resistor 106 to the input of amplifier 102. This arrangement acts as a comparator circuit. So long as the voltage flowing through resistor 100 is the same as the voltage flowing out through resistor 106 to voltage source 104, there will be no error signal supplied to integrator 102. However, when the output of demodulator 78 deviates from its nominal value, the excess or deficiency of current flowing through resistor 100 will cause integrator 102 to supply an output signal proportional to the integral of that current variation. This signal is then supplied through line 108 to the gate of field effect transistor 64. The feedback loop is such that the output of demodulator 78 is maintained at a constant voltage. Since the 1.9 micron channel is also being amplified by precisely the same amount as the 1.8 micron channel, the relationship between the two signals remains the same.

The output of demodulators 78 and 80 are supplied through unity gain buffer amplifiers 110 and 111, either to a computer or other appropriate electronic circuitry.

the opacity related signal, L, is taken from the feedback loop between the 1.8 micron channel and the gain control input to automatic gain control amplifier 56. Specifically, the signal, L, is taken from the common point between the output of integrator 102 and the gate of field effect transistor 64.

Although not important to the broad concept of the invention, it is important from an operational point of view that the type of f.e.t. used be matched with the polarity of the output of integrator 102. In this case an enhancement mode f.e.t. is used. Consequently increased signal from integrator 102 will cause increased conduction through f.e.t. 64 and therefore reduced gain out of the automatic gain control amplifier. Thus, as more radiation passes through the paper, the output of integrator 102 will increase which in turn lowers the resistance of f.e.t. 64. That more radiation passing through the paper means reduced opacity. Consequently in this case the opacity related signal is inversely related. Direct or inverse, the relationship is not important as will be seen from the following description of how the signal is used.

The signals from the 1.8 and 1.9 channels are typically supplied to a computer where they are combined. In the past the combination has taken the form of a pure ratio. However, it has proven advantageous to combine the signals in the following manner:

$$R = [K_9(C_{1.8} - D)]/[K_8(AC_{1.9}+B)]$$

(11)

where, $A$, $B$, and $D$ are constants that are updated by typical standardization techniques, $K_8$ and $K_9$ are constants determined at calibration time and $C_{1.8}$ and $C_{1.9}$ are the 1.8 micron channel and 1.9 micron channel signals respectively. The combination of the signals shown in equation 10 is not a significant deviation from the pure ratio for purposes of this invention, and is shown as an example of alternative expressions that are included in the symbol, $R$, for convenience. Clearly the invention covers all expressions that combine the signals from the 1.8 and 1.9 micron channels.

In calibrating the gauge, samples are prepared as discussed previously. However, in addition to using sample sets with different basis weights, it is also possible to use sample sets with the same basis weights but with different fiber compositions. For example, different hardwood/softwood percentages may be used in the two sample sets.

As can be seen from FIG. 4, the calibration curves for a given grade group do merge at a point. For example, the curves of group 1 merge at the point with the coordinates of $(W_o, R_o)_1$. However, the curves from different grade groups will typically merge at different points. In FIG. 4 the points are distinguished by the subscript on the outside of the parenthesis.

In addition to plotting water weight against ratio for the prepared samples, a plot of water weight against the opacity parameter, L, is also performed.

Figure 6:
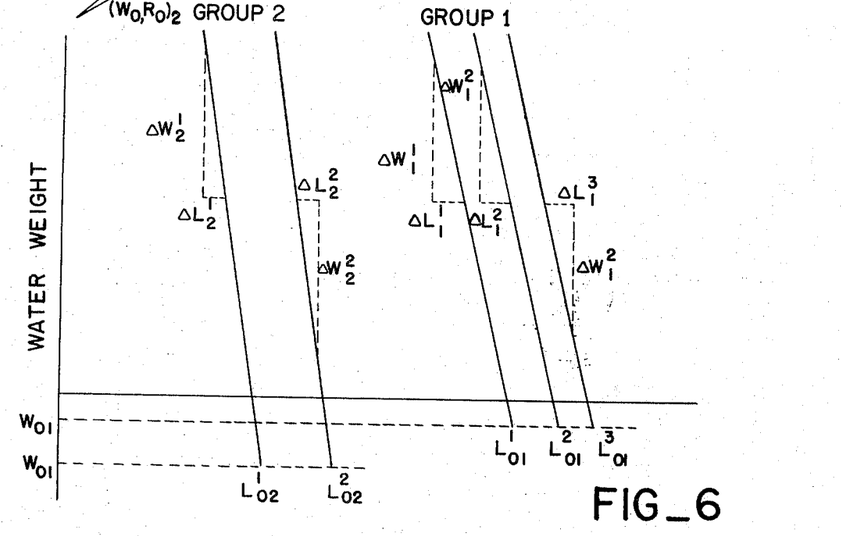
FIG. 6 is a graph of water weight, W, versus an opacity related signal, L, which is useful for explanation of the invention.

FIG. 6 is a graph of water weight versus L. For each sample discussed previously, not only is the ratio signal measured but also the opacity signal. Thus for each curve in FIG. 4 there is a corresponding curve in FIG. 6. Corresponding to the point $(W_o, R_o)_2$, there are two points $(W_o, L_o^1)_2$ and $(W_o, L_o^2)_2$. These points are determined by the intersection of the water weight versus L line with the $W_o$ value taken from the graph of FIG. 4. Similarly the water weight versus ratio lines of grade group number 1 in FIG. 4 have their corresponding lines in FIG. 6. As mentioned previously, the relationship between opacity signal and basis weight is an inverse one due to the choice of electronics. This is merely a choice of convenience and in no way is significant to the invention. That is to say, any opacity related relationship would work, even though the calibration curves may not be linear.

As can be seen from FIG. 4, water weight is some linear function of ratio. It may be expressed by the following equation:

$$W = A(R - R_o) + W_o$$

(12)

where $A$ will be described further and $R$, $R_o$, $W$ and $W_o$ are as previously defined.

From FIG. 6 an opacity slope $\theta$ is defined as follows:

$$\theta \neq \text{Opacity Slope} = (W - W_o)/(L - L_o)$$

(13)

From empirical analysis it has been shown that within a grade group, $A$ is a linear function of the opacity signal $L_o$. This relationship may be expressed by the following equation:

$$(\Delta W/\Delta R)_i = A = \alpha L_o^i + \delta$$

(14)

where $i$ represents the $i$th sample group.

Rearranging equation (14), one gets:

$$L_o^i = L - ([W - W_o]/\theta)$$

(15)

where $\alpha$, $\beta$, and $\theta$ are constants within a grade group.

Substituting equation (15) into equation (14), one gets the following equation:

$$A = \alpha[L - ([w - W_o]/\theta)] + \beta$$

(16)

Substituting equation (16) into equation (12), one gets the following equation:

$$(W - W_o) = \alpha[L - ([W - W_o]/\theta)](R - R_o) + \beta(R - R_o)$$

(17)

$$= L\alpha(R - R_o) - (\alpha/\theta)(W - W_o)(R - R_o) + \beta(R - R_o)$$

$$(W - W_o)[1 + (\alpha/\theta)(R - R_o)] = \alpha L(R - R_o) + \beta(R - R_o)$$

which may be written as follows:

$$(W - W_o) = (R - R_o)(\alpha L + \beta)/[1 + (\alpha/\theta)(R - R_o)]$$

(18)

Figure 7:
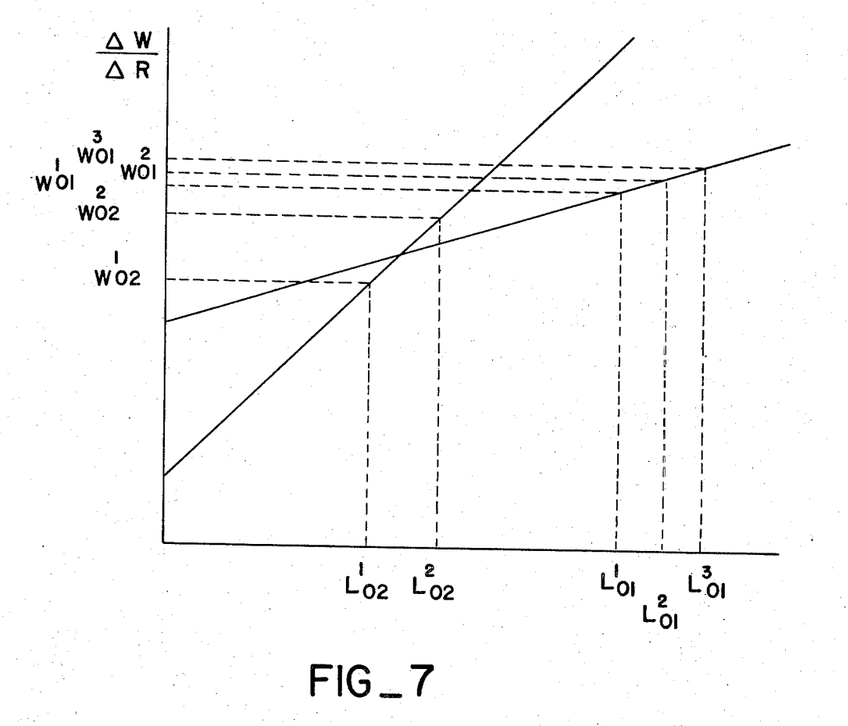
FIG. 7 is a graph showing the relationship between slope of the W versus R curve and the opacity related signal, L.

As can be seen, water weight is now given in terms of $R$ and $L$. All other factors, $\alpha$, $\delta$, $\theta$, $R_o$, and $W_o$ are constants for a given grade group. Thus water weight is again a single valued function of the parameters $R$ and $L$, both of which are supplied by the moisture gauge as described in the preferred embodiment. $R_o$ and $W_o$ may be taken directly from a plot of $W$ versus $R$ as in FIG. 4. $\theta$ is the slope of the lines in FIG. 6. The constants $\alpha$ and $\beta$ may best be determined by plotting $\Delta W/\Delta R$ as a function of $L$, as shown in FIG. 7. In plotting the graph of FIG. 7, information is taken from both FIGS. 4 and 6. From FIG. 4 the slope of the first sample of grade group 1, $\Delta W_1^1/\Delta R_1^1$, determines the Y coordinate of a point. From FIG. 6 the $L_o$ value of the first sample of grade group 1, $L_{o1}^1$, determines the X coordinate. The other points are plotted in the same manner. The constants $\alpha$ and $\beta$ can be taken directly from this graph as shown. Typically these constants, a set for each grade group, would be stored in the memory of a digital computer. However, as has been shown, the entire process can be done manually.

The invention has been explained and illustrated in terms of a two grade group situation for the sake of simplicity. The concepts do not change regardless of the number of grade groups.

A first preferred embodiment of the electronics used for carrying out the invention was discussed in connection with FIG. 5. There an automatic gain control type amplifier was used to maintain the signal level in the 1.8 micron channel constant and the parameters indicating the amount of radiation attenuation caused by the paper was the amplifier gain control signal. Now a second preferred embodiment of the electronics used for carrying out the invention will be discussed in connection with FIG. 8. In this case the lamp intensity is modulated to maintain the signal level in the 1.8 micron channel constant.

Figure 8:
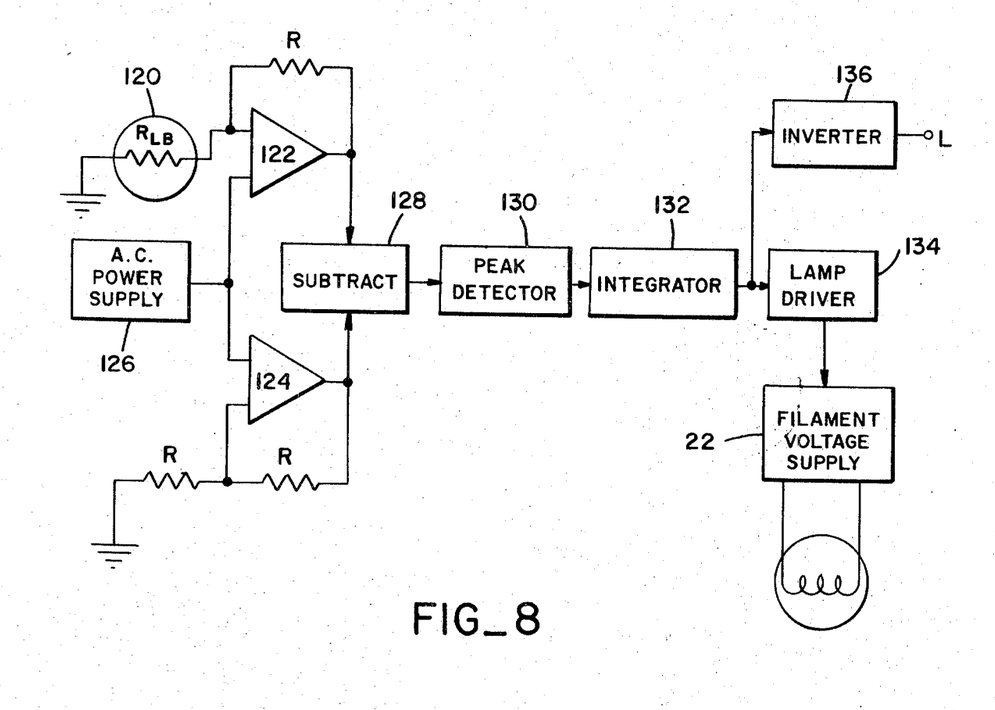
FIG. 8 is a block diagram of a second preferred embodiment of the electronics needed to carry out the invention.

Referring now to FIG. 8, the lead sulfide cell used to detect the 1.8 micron signal is indicated by reference numeral 120 and has a resistance value of $R_{1.8}$. This resistance forms one leg of a bridge whose other legs consist of three resistors labeled R and connected as shown to operational amplifiers 122 and 124. Power supply 126 is connected to one input of both amplifiers 122 and 124. With this arrangement, the outputs of amplifiers 122 and 124 are given by equations (19) and (20) respectively.

$$E_a = [(R + R_{1.8})/(R_{1.8})] E_c \quad (19)$$

$$E_b = [(R + R)/R] E_c \quad (20)$$

where $E_a$ is the output of amplifier 122, $E_b$ is the output of amplifier 124, and $E_c$ is the AC power supplied by power supply 126.

The outputs of amplifiers 122 and 124 are supplied to a subtracting unit 128. The output of subtract unit 128 is given by equation (21) from which it can be seen that if $R_{1.8}$ is exactly equal to $R$ then the output will be 0.

$$E_S = E_A - E_B = [(R + R\ 1.8)/R_{1.8}] E_c - [(R + R)/R]E_c \quad (21)$$

Furthermore, it is clear that the polarity of the output signal will depend upon whether or not $R_{1.8}$ is greater or smaller than $R$. In short, the output of subtractor unit 128 provides a signed signal which is proportional to the deviation of the resistance, $R_{1.8}$, from the resistance, $R$. The output of subtract unit 128 is supplied to synchronous detector 130 which in turn converts the AC information supplied from the subtractor to equivalent DC information. This information is then supplied to integrator 132 which insures a zero residual error feedback signal. The output of integrator 132 is supplied to lamp driver 134 which in turn controls the lamp filament voltage 22 and thereby controls the intensity of filament 21.

In operation, lead sulfide cell 120 detects the intensity of radiation received in the 1.8 micron channel from filament 21. If this radiation deviates from a predetermined value an error signal is generated by the bridge arrangement which is then integrated and supplied to lamp voltage supply. The error signal is such that the intensity of radiation put out by the lamp is driven in the direction that will cause the error signal to approach zero.

Many other circuit arrangements including a conventional Wheatstone bridge could be used in this circuit.

As can be seen, this arrangement although different in many details will tend to produce a feedback signal which is indicative of the opacity of the paper. This is true since to maintain the intensity of radiation received on one side of the paper constant, the intensity of the lamp will vary with respect to the opacity of the paper. Higher intensity light will be required with more opaque papers and vice versa.

To take advantage of this, the output of integrator 132 is supplied through an inverter 136 which merely makes the opacity compensation signal correspond with that given by the first preferred embodiment of the electronics. That is to say, as the opacity of the paper increases, the opacity compensation signal will decrease. A more detailed explanation of the second preferred embodiment may be found in U.S. Pat. No. 3,614,450 issued in Oct. 19, 1971 to Hill et al. and entitled *Apparatus for Measuring the Amount of a Substance That Is Associated with a Base Material*. This patent is assigned to the assignee of the present application.

We claim:

1. In a method of measuring the moisture content of a moving sheet of paper being manufactured by a paper machine with a dual wavelength radiation type gauge that provides a first output signal, $R$, representative of the ratio of the absorption of radiation in a band highly sensitive to absorption by water and in a nearby band that is relatively less sensitive to absorption by water, the steps comprising: generating a second signal, $L$, functionally related to the opacity of said moving sheet of paper; and combining said second signal with said first signal to produce a third signal, $W$, indicative of the water weight per unit area of said moving sheet of paper in accordance with the relationship $$W - W_o = (R - R_o)(\alpha L + \beta)/[1 + (\alpha/\theta)(R - R_o)]$$

where $W_o$, $R_o$, $\alpha$, $\beta$, and $\theta$ are constants whereby said moisture measurement is relatively insensitive to fiber variations.

2. The method of claim 1 further characterized by generating a fourth signal, $BW$, proportional to the basis weight of said paper; and dividing said third signal by said fourth signal to form a fifth signal proportional to the percent moisture in said paper.

3. A method of measuring the amount of moisture in a moving sheet of paper manufactured by a paper machine with a radiation type gauge that supplies an output signal, $R$, proportional to the ratio of radiation received having a wavelength that is outside of the absorption band of water and a wavelength received that lies within the absorption band of water and provides a second signal, $L$, indicative of the attenuation of the non-water sensitive radiation by the paper, the steps comprising: preparing two sets of paper samples having different fiber constituents, the individual samples of each set having different known water weight; supplying said samples, one at a time, to said moisture gauge and obtaining a ratio reading, $R$, and said second signal attenuation reading, $L$, therefrom for each sample, determining the intersection point of a curve generated from a plot of the ratio measurement, $R$, against the known water weights, $W$, for samples in said first set of samples with a curve determined by a plot of the ratio signal, $R$, versus water weight, $W$, for samples in said second set of samples; determining the slope of each of said curves; determining the attenuation value, $L_o$, associated with said intersection point for each set of samples; determining a set of constants associated with a curve generated from a plot of said slope measurement against said $L_o$ points; and utilizing said constants to provide a relationship between said water weight, $W$, said ratio signal, $R$, and said attenuation signal, $L$.

4. In a method of measuring the moisture content of a moving sheet of paper being manufactured by a paper machine with a dual wavelength radiation type gauge that provides a first output signal, $R$, representative of the ratio of the absorption of radiation in a band highly sensitive to absorption by water and in a nearby band that is relatively less sensitive to absorption by water, the steps comprising: generating a second signal, $L$, functionally related to the opacity of said moving sheet of paper; determining a set of constants relating the dependent variable of moisture content, $W$, with variations in $L$ and $R$; and utilizing said constants in combination with current measurements of $L$ and $R$ to determine $W$ whereby said moisture value $W$ is relatively insensitive to fiber variations.

5. A method as in claim 4 where said constants are determined by the steps of: preparing two sets of paper samples having different fiber constituents, the individual samples of each set having different known water weights; supplying said samples, one at a time, to said moisture gauge and obtaining a ratio reading, $R$, and said second signal attenuation reading, $L$, therefrom for each sample; determining the intersection point, $(R_o, W_o)$ of a curve generated from a plot of the ratio measurement, $R$, against the known water weights, $W$, for samples in said first set of samples with a curve determined by a plot of the ratio signal, $R$, versus water weight, $W$, for samples in said second set of samples; determining the slope, $\Delta W/\Delta R$, of each of said curves; determining the attenuation value, $L_o$, associated with said intersection point for each set of samples and the slope, $\theta$, from a curve relating $L$ with $W$; and determining the constants $\alpha$ and $\beta$, from the slope and intercept point of a curve generated from a plot of said slope, $\Delta W/\Delta R$ against said $L_o$ points; $W$ being determined by the relationship $$W = (R - R_o)(\alpha L + \beta)/[1 + (\alpha/\theta)(R - R_o)]$$

where $W_o$, $R_o$, $\alpha$, $\beta$, and $\theta$ are constants whereby said moisture measurement is relatively insensitive to fiber variations.

* * * * *